Sept. 19, 1967  G. J. CAMPBELL, JR., ET AL  3,342,029
PROCESS AND APPARATUS FOR FORMING TWISTED LINK CHAIN
Filed Aug. 3, 1964  2 Sheets-Sheet 1

INVENTORS
GEORGE J. CAMPBELL, JR.
JOHN McCARTNEY
BY
ATTORNEY

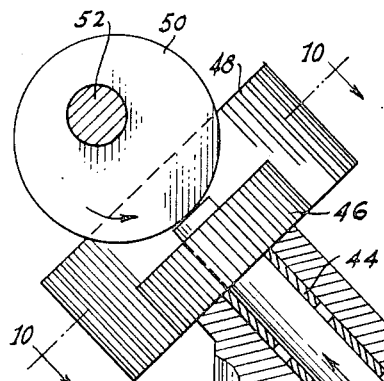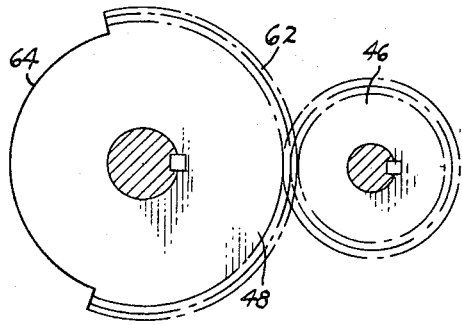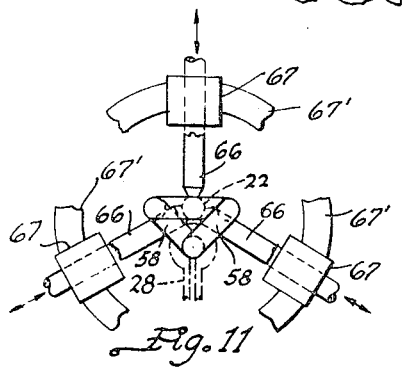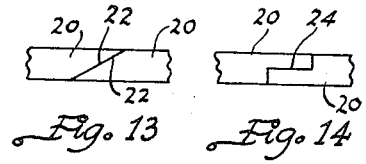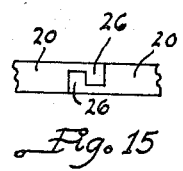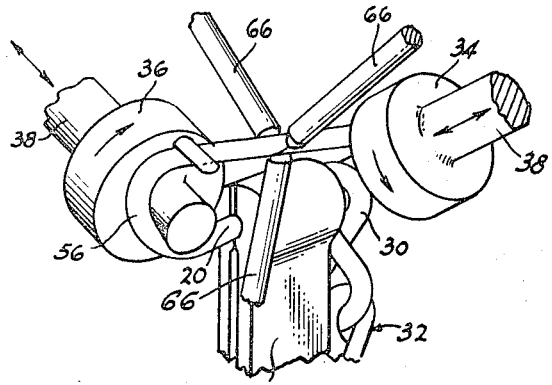

United States Patent Office

3,342,029
Patented Sept. 19, 1967

3,342,029
PROCESS AND APPARATUS FOR FORMING
TWISTED LINK CHAIN
George J. Campbell, Jr., and John McCartney, York, Pa.,
assignors to Campbell Chain Company, York, Pa., a
corporation of Pennsylvania
Filed Aug. 3, 1964, Ser. No. 386,905
17 Claims. (Cl. 59—18)

ABSTRACT OF THE DISCLOSURE

Apparatus and a process for forming twisted link chain by a first step of bending pieces of wire stock initially into pre-twisted configuration, prior to welding the ends together to complete the links, and as a second step, welding the ends of each link by spot welding the same due to the ends being at least partially in overlapping relationship to permit the use of spot welding.

---

This invention pertains to a process and also one embodiment of apparatus for forming twisted link chain by a much more rapid and, consequently, more economical manner of manufacturing such chain than has been possible by the procedures previously and presently used.

The term "twisted link chain" applies to that type of chain comprising so-called oval or elongated links made from uniform lengths of wire stock. The links initially are formed in so-called flat condition, wherein all parts of each link initially lie within a common plane, and the links are completed by welding the abutting ends thereof substantially intermediately of the ends of one side of each link. After such formation and welding of the links, whereby a completed conventional type of chain is formed, said chain is subjected to a further step of passing it through a twisting machine which engages each link and twists the same about the longitudinal axis thereof, to the extent that the opposite ends of each link are disposed respectively within planes that are substantially at about 90° to each other along the longitudinal axis of each link.

Twisted link chain of the type described has many uses in industry. Among the principal uses, however, is that of serving as the basic type of chain from which cross-chains used in sets of anti-skid chains for automotive vehicles are formed. Usually, anywhere from approximately 6 to 8 links of said chain are used in each cross-chain of said sets of anti-skid chain, suitable attaching hooks being respectively applied to the opposite ends of such short lengths of chain. One of the principal reasons for this type of chain being suited for use as cross-chains of such type is that all surfaces of the chain which engage a pneumatic tire of automotive vehicles are rounded and smooth and thereby minimize wear imposed upon such tires, in addition to the fact that when the chain extends across the road-engaging surface of a pneumatic tire, a substantial projection is provided which digs into snow, mud, and the like, and therefore affords appreciable traction to the wheel of the vehicle. Further, where additional traction is desired, it is relatively common practice at present to weld additional lugs to each of the road-engaging links of such cross-chains and because of the particular twisted nature of said links, the opposite sides of each such link are well-adapted to receive such transversely extending lugs which are welded to said opposite sides.

As can well be imagined from the foregoing description of the present method of forming twisted link chain, each time chain has to be passed through manufacturing machines or mechanism, time is involved, as well as the expense of operating the machines, whereby, in general, each additional passage of the chain through an operating procedure adds to the cost thereof and, conversely, each passage of the chain through the machine which can be eliminated, correspondingly reduces the cost thereof.

It is the principal object of the present invention to provide both a process and at least one principal type of apparatus capable of performing said process for forming twisted link chain by a minimum of operations, thereby reducing the cost of producing such type of chain to a corresponding minimum. With a view to achieving this objective, the present invention embodies, as the initial primary step of the process, the shaping of pre-cut uniform lengths of wire stock from which each link is to be formed into a configuration resembling that of a twisted link having the opposite ends disposed within planes substantially at 90° to each other along the longitudinal axis of the links, but which twist, in accordance with conventional practice, is applied after the link is welded. In contrast to this, the present invention envisions such configuration being applied to the link prior to being welded, whereby the welding of the ends of each link which are brought into engagement with each other at the completion of such formation of each link occurs as a final essential step to the formation of such twisted links. The primary advantage offered, therefore, by the present invention comprises the utilization of the initial forming operation to cause the final shape of the link to be imparted to each link during the initial and only shaping operation required in accordance with the new procedure comprising the present invention.

It is another object of the invention to provide exemplary apparatus by which the aforementioned procedure for forming such twisted link chain through the employment, primarily, of only two essential steps, as distinguished from three or more in accordance with conventional practice, said apparatus providing means by which the cut lengths of chain wire stock, as successively severed from continuous supply lengths thereof, are advanced to gripping means which engage said lengths intermediately of the ends thereof, while additional apparatus preferably simultaneously engages the opposite ends of said cut lengths of wire stock and bend the same respectively within planes substantially at 90° to each other along the longitudinal axis of the link being formed, thereby bringing said opposite ends of the pieces of stock into engagement with each other and, further in accordance with the preferred operation of said apparatus, welding of said ends of the links occurs while said ends are held in engagement with each other by the apparatus which bent the ends into said desired configuration comprising that of a twisted link.

It is a further object of the invention to provide apparatus of the aforementioned type in which appropriate mechanism is provided to rotate bending heads which respectively bend the opposite ends of the gripped lengths of stock, such rotation being in opposite directions so as to bend said ends toward each other, and additional mechanism is provided for appropriately retracting and projecting said bending heads so as to engage and disengage the stock and completed chain links at the appropriate intervals of time in accordance with the entire process of forming such twisted link chain.

Still another important object of the invention is to provide a process and apparatus by which relatively short lengths of twisted link chain may be formed, rather than continuous lengths thereof, as is necessary in accordance with presently-used apparatus, thereby effecting substantial saving, particularly over present procedures for making cross-chains used in sets of anti-skid chains for automotive vehicles, wherein it is necessary to sever and thereby waste the connecting link between the desired short lengths of chain to be employed in such cross-chains, said connecting link being required to be sheared and thereby rendered useless, so as to provide successive short lengths of chain of similar numbers of connected links, which initially are supplied in continuous lengths of twisted link chain as required by conventional manufacturing procedures now employed.

Details of the foregoing objects and of the invention, as well as other objects thereof, are set forth in the following specification and illustrated in the accompanying drawings comprising a part thereof.

In the drawings:

FIG. 9 is a fragmentary, partial longitudinal section view of supporting, driving, and actuating mechanism for the bending heads.

FIG. 9a is a sectional detail taken on line 9a—9a of FIG. 9.

FIG. 10 is a transverse sectional view of the apparatus shown in FIG. 9 as seen on the line 10—10 of said figure.

FIGURE 11 is an exemplary end view of a link shaped by the apparatus of the preceding figures in process of the ends of the link being welded together while the link is still engaged by the gripping means which clamp the stock to hold the same while the opposite ends are being bent.

FIG. 12 is a perspective view similar to FIG. 3 but showing, in exemplary and schematic manner, three welding electrodes of the type otherwise illustrated in FIG. 11, said electrodes being in the process of welding permanently together the ends of the link which has been shaped by the bending heads.

Figure 1:
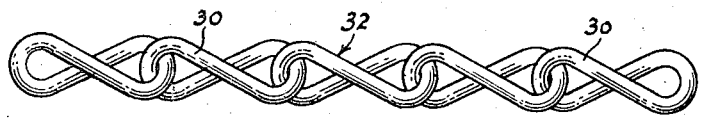
FIG. 1 is a side elevation of an exemplary length of twisted link chain employed in the manufacturing of crosschains for sets of anti-skid chains attachable to the wheels or tires of automotive vehicles, the configuration of links shown therein being those capable of being manfactured by the process and apparatus comprising the present invention.

FIGS. 13–15 respectively are fragmentary side views of different end formations provided in the opposite ends of the cut lengths of chain wire stock, which ends are adapted to be permanently connected by welding, and especially spot welding.

To the extend possible, mechanism employed in conventional chain making apparatus, and particularly that adapted for making twisted link chain, is contemplated for employment in the apparatus embodying the principles of the present invention. In this regard, for example, a conventional supply reel 10 is appropriately mounted for paying off, continuously, as required by the feed mechanism of the machine, wire stock 12, which is of appropriate size and gauge for use in the making of twisted link chain of any size desired, within reasonable limits, and especially twisted link chain appropriate for use as cross-chains of anti-skid chain sets applicable to pneumatic tires and the like of automotive vehicles. In view of the coiled nature of the wire stock 12, it is necessary to pass the same through appropriate sets of straightening rolls 14 and 16. As is conventional, there are usually a plurality of pairs of the straightening rolls in each group, said groups respectively having the axes of the rolls arranged at right angles to each other, whereby straightening of the wire in planes transverse to each other is effected to insure reasonably straight wire to be fed to the shearing mechanism 18.

Though details of the shearing mechanism 18 are not shown, it is to be understood that such mechanism comprises cooperating dies through which the wire stock 12 is fed and the dies are of a complementary nature, shaped appropriately to provide any desired configuration on the ends of the severed wire pieces 20, which are cut to be uniform lengths required to form links of identical length and shape when the pieces are formed into link configuration. In accordance with the principles of the present invention, it is preferred that the opposite ends 22 of each of the wire pieces 20 from which links are to be formed be so arranged with respect to each other when said opposite ends are bent into engagement with each other, incident to forming a link, that said ends at least partially overlap each other. In this regard, a number of different exemplary configurations are illustrated respectively in FIGS. 13–15, all of which are suited for use in the making of chain links in accordance with the principles of the invention. However, it is to be understood that said configurations are for purposes of illustration only and not restriction, other overlapping arrangements being possible. The principal purpose of having such overlapping ends is to permit the use of spot welding to unite the ends of the chain links as distinguished from butt welding, which commonly is employed in chain making procedures of a number of different kinds. Butt welding may be used, though, if desired.

Figure 3:
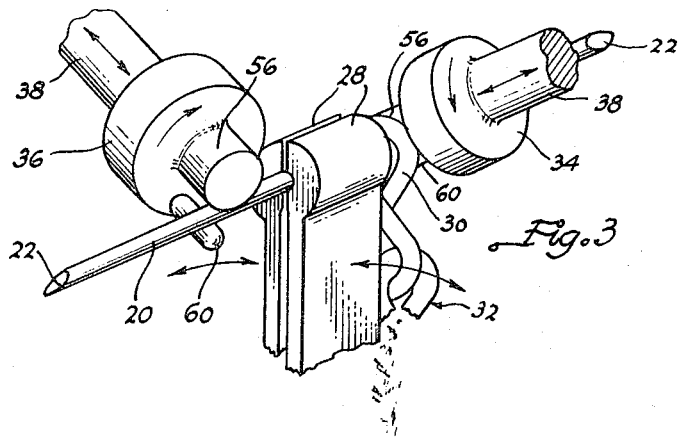
FIG. 3 is a fragmentary, perspective view of the essential elements of the mechanism shown in FIG. 2 for purposes of bending uniform lengths of chain wire stock into links having the same configuration as twisted links presently made by conventional procedures and apparatus.
Figure 4:
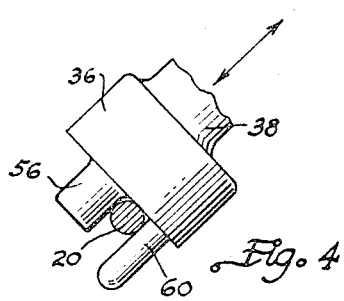
FIG. 4 is a fragmentary side elevation of the left-hand bending element of the apparatus shown in FIG. 3 substantially at the commencement of the bending operation.
Figure 5:
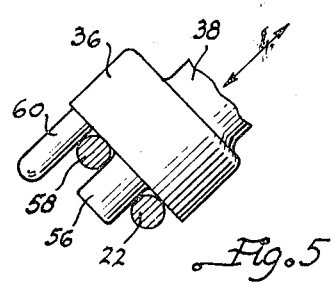
FIG. 5 is a fragmentary view of the same bending head shown in FIG. 4 but after it has been rotated substantially 180° to effect a desired bend in the wire stock.
Figure 6:
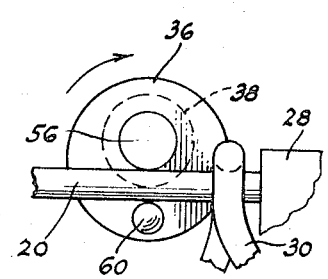
FIG. 6 is a fragmentary end view of the right-hand bending head shown in FIG. 3 at the commencement of the bending operation and showing a fragmentary portion of the last-formed link placed upon the wire stock in process of being bent.
Figure 7:
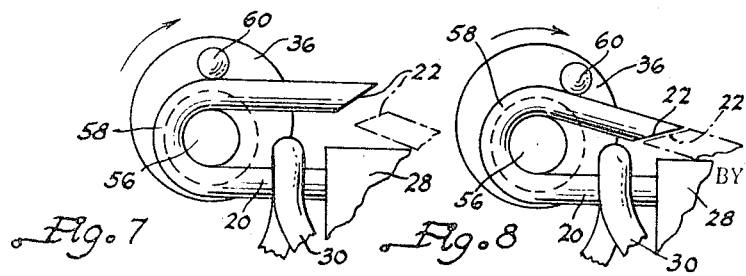
FIG. 7 is a fragmentary end view of the bending element shown in FIG. 6 substantially at the completion of 180° of rotation.
Figure 8:
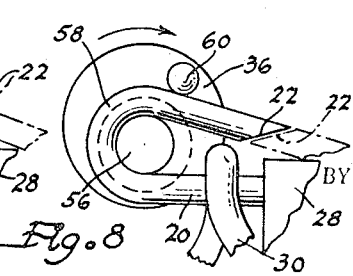
FIG. 8 is a view similar to FIG. 7 but showing the bending head in a still further advanced bending position from that shown in FIG. 7 and in which position the ends of the bent link are in engagement with each other.

In the specific illustration of FIGS. 3, 7 and 8, it will be seen that the ends 22 of the individual pieces 20 are in planes diagonal to the length of the wire stock, so as to form, in the finished link, an overlapping configuration such as shown in FIG. 13. However, overlapping ends 24, for a half-together configuration, is highly suited for use in connection with the techniques of the present invention, such arrangement being illustrated specifically in FIG. 14. Referring to FIG. 15, overlapping and interlocking end portions 26 may be employed on opposite ends of the pieces 20, in the spirit of the present invention. All of such end configurations are contemplated for formation by the shearing dies of the mechanism 18.

After the pieces 20 successively are sheared from the wire stock 12 by shearing mechanism 18, said pieces are gripped firmly between opposed jaws 28, as clearly shown in FIG. 3. The motion of the jaws toward and from each other is as indicated by appropriate arrows in FIGS. 1 and 3. Operation of said jaws is by suitable mechanism somewhat common to chain-forming machines and not illustrated in detail herein since any type of appropriate operating mechanism may be used. Incident to projecting the leading end of the wire stock 12 through the shearing mechanism 18 and in position to be engaged by gripping jaws 28, the leading end of the wire, which becomes piece 20 after being sheared from the stock, is projected through the last-formed link 30 of the completed chain 32 comprising permanently connected links which have been welded by mechanism to be described in detail hereinafter.

Positioned for operation adjacent the clamping or gripping mechanism comprising jaws 28 are a pair of bending heads 34 and 36 which are fixed to the outer ends of similar drive shafts 38. Said shafts, by reference to FIG. 9, will be seen to be both rotatably and longitudinally movable within a support 40 provided with appropriate spaced bearings 42 and 44, in which the shafts 38 rotate and reciprocate. Rotation of the shafts is effected by means of a driven gear 46, which is suitably fixed and keyed to the end of each of the shafts 38 opposite those ends which carry the bending heads 34 and 36. Gear 46 is narrower than the face of driving gears 48 with which the driven gears 46 mesh and relative to which they are capable of moving axially a limited amount for purposes of projecting and retracting the bending heads 34 and 36 between the full line projected position shown in FIG. 9 and a retracted position in which the cam 50 has been rotated 180° to that shown in FIG. 9 and the shaft 38 has moved axially inward to engage said cam. The full line, projected position is the operative, bending position for said bending heads.

The driving gears 48 may be powered by any suitable mechanism, not shown, and, incident to the shafts 38 being rotated by the driven gears 46, said shafts also are reciprocated longitudinally by appropriate cams 50 which are mounted upon and revolved by drive shafts 52, shown in FIG. 9. Incident to the rotation of the cams 50 by their respective drive shafts 52, which preferably rotate continuously, the shafts 38 are moved longitudinally in one direction by the cams 50 to project the bending heads 34 and 36 to the full line, operative positions thereof, while retraction thereof to the dotted line positions is effected by compression springs 54 which constantly urge the cam-engaging ends of the shafts 38 into wiping engagement with the periphery of the cams 50, whereby when the shortest portions of the cams 50 are in engagement with said end of the shaft 38, the spring 54 will cause retraction of the bending heads to said dotted line position shown in FIG. 9.

As best seen from FIG. 3, the shafts 38 respectively are mounted in separate supports 40, which are so positioned with respect to the frame of the overall chain-forming machine that, as viewed axially of the clamped or gripped wire piece 20 with respect to FIG. 3, the shafts 38 are substantially at a right angle to each other. The bending heads 34 and 36 are shown in FIG. 3 in the projected, full line position thereof as viewed in FIG. 9. Each of said heads is provided with a short, cylindrical projecting anvil 56 having a diameter substantially equal to that of the loops 58, see FIGS. 7 and 8 especially, to be formed in the opposite ends of each link and around which the projecting ends of the pieces 20 are bent when the bending heads 34 and 36 are rotated.

Such bending of the opposite ends of the link-forming pieces 20, while preferably firmly gripped by the gripping jaws 28, is accomplished, preferably simultaneously, so as to bend said opposite ends toward each other but within planes substantially at 90° to each other along the longitudinal axis of the pieces 20 when gripped by the jaws 28. Bending of said ends by the bending heads 34 and 36 is accomplished by wiping pins 60, which likewise are carried by the outer faces of the bending heads 34 and 36 and project outwardly therefrom so as to be parallel to the anvils 56 and spaced therefrom a distance at least equal to the diameter of the wire pieces 20, as clearly shown in FIGS. 4–8.

Figure 2:
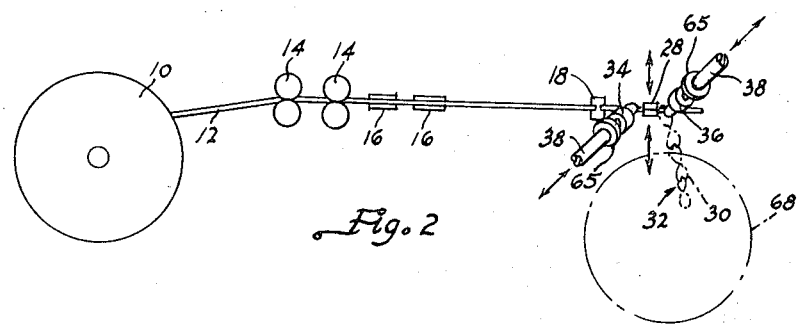
FIG. 2 is a schematic showing of manufacturing apparatus embodying the principles of the present invention for making twisted link chain.

In addition to the shafts 38 being substantially at 90° to each other when viewed axially from one end of the gripped piece 20 shown in FIG. 3, by reference to FIG. 2, it also will be seen that, as viewed in plan, from above the apparatus, the shafts 38 also are disposed in vertical planes substantially parallel to each other but slightly spaced apart so as to offset the shafts with respect to each other in directions somewhat diagonal of the axis of the gripped piece 20. Accordingly, it will be seen that the vertical planes within which the shafts 38 revolve are at acute angles to the axis of the gripped piece 20, said angles each being approximately 45°, as indicated diagrammatically in FIG. 2.

From the foregoing, it will be seen that the two essential steps of the process comprising part of the present invention are, (1) to bend a cut length of wire stock initially into a configuration resembling a conventional twisted chain link which is formed by conventional procedures involving a separate twisting operation after the initially flat links are welded, and (2) to weld the thus-bent and formed links together to unite the same permanently and also to connect each newly formed link to the last-formed link of the chain. The operation of the herein described and illustrated embodiment of apparatus or mechanism for performing such process is as follows:

The wire stock 12 is moved from the straightening roll units 14 and 16 to the shearing mechanism 18 for purposes of cutting pieces 20 of such wire stock into uniform lengths after the same have been projected into position to be engaged by the gripping jaws 28. The jaws 28 will grip the severed piece when the shearing has been completed and, incident to such severing, the end surfaces 22, as well as the additionally illustrated surfaces 24 and 26, if selected, are formed on the opposite ends of the pieces 20. After said pieces are firmly gripped by the jaws 28, the bending heads 34 and 36 are moved axially by their shafts 38 into the projected, operative positions thereof shown in FIG. 3. The wiping pins 60 are in the relative positions with respect to the anvils 56, as illustrated in FIG. 3, when initial engagement of the piece 20 by the bending heads occurs.

Such projection of the bending heads and shafts 38 is accomplished by rotation of the cams 50. Further, it will be seen that the driving gears 48 preferably are of an interrupted nature and the toothed portion 62 is substantially equal in length to the toothed circumference of the driven gears 46. In view of this arrangement, continuous rotation of the drive shaft which carries the drive gears 48 may take place and, when the interrupted portion 64 of the drive gears 48 is opposite the driven gears 46, no rotation of the drive shafts 38 will occur. Such inoperativeness of the drive shafts will enable the removal of finished links from the gripping jaws 28 and the placement of new pieces 20 therein, for example.

When the bending heads 34 and 36 are in operative position with respect to the wire piece 20 to be bent thereby, as viewed in FIG. 3, due to the cams 50 having projected the shafts 38 to so position said heads, the lead end of the toothed portion 62 of the drive gear 48 will engage the driven gears 46 to rotate the shafts 38 and bending heads 34 and 36 in the directions of the arrows shown on said heads in FIG. 3. It thus will be seen that the heads, in effect, are rotated toward each other, thereby bending both of the opposite ends of the piece 20 upwardly with respect to gripping jaws 28 and toward each other but within planes respectively disposed substantially at 90° to each other along the axis of the piece 20.

In accordance with the preferred operation of the cams 50, drive gears 48 and driven gears 46, when the loops 58, see FIGS. 7, 8 and 12, have been formed in the opposite ends of the new link being formed incident to being connected to the last-formed link 30 of the chain product 32, retracting movement of the bending heads 34 and 36 will commence when the loops 58 have been nearly completely formed, somewhat as shown in exemplary manner in FIG. 7, for example, wherein it will be seen that the opposite ends 22 of the bent piece 20 are nearly in engagement with each other. Substantially at the time the ends 22 are actually and firmly in engagement with each other as a result of the wiping pins 60 advancing further, from the position shown in FIG. 7 to that shown in FIG. 8, for example, the pins 60 will substantially have been retracted from engagement with the overlapping ends 22 of the now-shaped piece 20.

Further in accordance with the desired, exemplary operation of the apparatus described and illustrated herein, when the overlapping engagement of the ends 22 of the shaped wire piece 20 has occurred, as viewed in FIG. 8, for example, exemplary welding equipment is brought into operation to permanently unite the overlapping ends 22 of the now-shaped link which has been formed from piece 20. The overlapping ends can be held substantially in engagement with each other by the action of wiping pins 60, at the end of the bending operation, for example, such as when the trailing end of the toothed portion 62 of the driving gears 48 disengage the driven gears 46. To prevent reverse movement of the bending heads 34 and 36, as well as wiping pins 60, a one-way clutch 65, of suitable construction, may be employed between shafts 38 and supports 40. One exemplary type of one-way clutch is shown in section in FIG. 9a, which is seen on the line 9a—9a of FIG. 9.

Due to the fact that one side of each formed link 30 is gripped by jaws 28 of the gripping mechanism and is firmly held thereby while the loops 58 in the opposite ends of the links are formed to bring the ends of the pieces 20 into adjacent position for welding, it will be seen that the gripped side will be relatively straight and untwisted about its axis. Particularly where the links are relatively short in relation to the width thereof, it is apparent that the side of the link formed by the welded, bent ends will differ in shape from that of the opposite straight side. In view of this, it will be possible to distinguish links formed by the procedure and apparatus of the present invention from those formed by conventional procedures and apparatus in which the ends of each link are first welded to form one side before the link is twisted and uniform twisting of the opposite sides then occurs. Further, whereas spot welding may not be adequate to withstand conventional twisting to form links by conventional methods on conventional apparatus, it is quite satisfactory to form links by the procedure and on apparatus such as shown and claimed herein, wherein no final twisting of the links occurs after welding the ends. Welding only occurs according to the invention after the links have been pre-shaped in twisted configuration.

The welding equipment is diagrammatically illustrated in FIG. 11 and comprises a plurality of radially extending electrodes 66, as shown in FIGS. 11 and 12, which quickly are brought into operation. It will be understood that the electrodes 66 are mounted for radial reciprocation within bearings 67 supported by portions 67' of the frame of the apparatus, such portions being shown fragmentarily in FIG. 11. The electrodes are actuated by appropriate mechanism of conventional type such as cams, air cylinder units, or the like, not shown, and the number of said electrodes preferably is more than two. Further, the angular spacing between the electrodes as viewed axially of the side of the link being welded preferably is that of equal angles, such as shown in FIG. 11 but, particularly if the engagement of the tips of the electrodes with the overlapping ends 22 of the link is utilized at least partially for clamping purposes, it may be that equal angles between the electrodes would not be the most effective arrangement. For example, an arrangement somewhat resembling a conventional Y might be more appropriate.

Further in accordance with the preferred principles of the invention, the electrodes 66 are of the spot-welding type. The employment of spot welding equipment is made possible particularly in view of the overlapping nature of the various embodiments of end constructions 22, 24 and 26, as well as others of an overlapping nature which might be used, whereby the welding current effectively may pass through overlapping portions of said ends of the links as is necessary in employing spot welding equipment. Further, inasmuch as the welding of the overlapping ends occurs substantially midway between the opposite ends of the link being formed, the location of one side of the link being formed, the location of operation of the welding electrodes will be substantially transversely in alignment with the gripping jaws 28, as illustrated somewhat diagrammatically in FIG. 12. Inasmuch as the welding operation is momentary, immediate retraction of the electrodes 66 is effected.

Upon the completion of the welding of the ends 22, 24, 26 and the like of the links being formed in accordance with the process and apparatus comprising the present invention, the bending heads 34 and 36 will be in retracted position and therefore out of engagement with the loops 58 at the opposite ends of said links. The electrodes 66 also will be retracted, whereupon the jaws 28 may be separated to permit appropriate transfer of the newly completed link, by appropriate mechanism for such purpose, not shown, and by which mechanism the newly formed link will occupy the position of the last-formed link 30 shown in FIG. 12, for example. When in such position, said newly formed link, which now becomes the last-formed link, will be in position to have a new severed wire piece 20 projected therethrough incident to being engaged by the gripping jaws 28. As is customary in chain making, the finished chain 32 will be directed to an appropriate receptacle, such as a barrel 68 shown in FIG. 2, until usual finishing is done.

As distinguished from conventional apparatus and mechanism for making twisted chain, wherein the links are initially formed substantially flat, followed by welding, and then such welded link chain is fed through link-twisting mechanism as a separate and distinct step from the initial forming operation, and thereby adding an extra cost to the manufacturing of twisted link chain, continuous feeding of substantial lengths of chain is necessitated by the nature of the apparatus employed. Accordingly, in using such conventional apparatus, it is not possible to make relatively short lengths of chain, of the order of six to eight links connected to each other, successively and unconnected to each other. Accordingly, where such short lengths of twisted link chain are desired particularly for purposes of making cross-chains for sets of anti-skid chains for motor vehicles, it is necessary to feed continuous lengths of twisted link chain through appropriate shearing mechanism and, for example, where cross-chains embodying eight links are desired, each ninth link must be removed completely so as to separate a short length of eight links from the leading end of the continuous length of chain, resulting in complete waste of each ninth link. While not individually of substantial cost, in the aggregate, wasting each ninth link, after otherwise completely forming the same, is a distinct loss in the manufacturing of sets of anti-skid chains for motor vehicles.

Due to the fact that the present invention contemplates initially imparting to a chain link the configuration of a conventional twisted link, followed by welding of the engaging ends of the thus-formed link, whereby no subsequent twisting of the link is required, it will be seen that the process comprising the present invention is applicable to the forming of successive short lengths of chain each having a uniform number of links, for example, such as illustrated in exemplary manner in FIG. 1, and not connected to each other. Accordingly, the loss now necessary which results from the severing of each connecting link by which the desired short lengths of chain are connected together in a continuous length thereof, is obviated.

While the invention has been described and illustrated in its several preferred embodiments, it should be understood that the invention is not to be limited to the precise details herein illustrated and described since the same may be carried out in other ways falling within the scope of the invention as claimed.

We claim:
1. A process of making twisted link chain comprising the steps of preparing successive pieces of wire stock of uniform length, forming said lengths of wire while extending through the last-formed link successively into a closed elongated loop configuration having the opposite ends disposed within planes at substantially 90° to each other along the longitudinal axis of said loop, and welding the ends of each loop thus formed to connect the ends thereof into a finished chain link having substantially the same configuration as a pre-welded elongated chain link after being twisted along its longitudinal axis substantially 90°.

2. A process of making twisted link chain comprising the steps of cutting and feeding successive pieces of wire stock of uniform length, bending the opposite ends of said lengths of wire substantially into engagement with each other while coincidently being deformed to produce a configuration of a link twisted about its longitudinal axis substantially 90°, passing said wire through the last-formed link during the formation of each additional link, and welding the ends of each link to permanently connect the same.

3. A process of making twisted link chain comprising the steps of preparing successive pieces of wire stock of substantially uniform length having the ends of each piece prepared for complementary co-engagement with each other when formed into a link, producing a compound bend in each of the opposite ends of said pieces to connect said pieces to the last-formed link and also place said ends substantially into engagement with each other and simultaneously produce a configuration resembling that of a pre-welded link twisted about its longitudinal axis substantially 90° and the ends being substantially in complementary co-engagement, and welding said ends to connect the same permanently with each other and to the previously formed links.

4. The process of making twisted link chain comprising the steps of preparing successive pieces of wire stock of uniform length, gripping the mid-portion of each piece and bending the opposite end portions toward each other substantially within planes approximately at an angle of 90° to each other along the longitudinal axis of the link being formed while one end of the wire piece extends through the last-formed link until the ends of said piece are substantially in engagement, and welding the ends of said piece to form a permanent link connected permanently to adjacent links and having the configuration of a pre-welded link having the opposite ends thereof twisted substantially 90° about the longitudinal axis of the link.

5. The process of making twisted link chain according to claim 4 and including the additional step of forming the ends of said pieces of wire so as to be complementary and at least partially overlapping, and said welding comprising spot-welding.

6. The process of making twisted link chain according to claim 4 including the further step of holding the bent end portions of the links by the mechanism which bends said ends while the ends are being welded.

7. Apparatus to form twisted link chain comprising in combination, means to feed chain-making wire from a supply thereof, means operable successively to shear from the delivery end thereof pieces of substantially uniform length, means to grip said pieces intermediately of the ends thereof while one end extends through the last-formed link, means to bend the ends of each piece substantially within planes disposed at 90° to each other along the axis of the piece being bent until the ends of said pieces substantially engage each other, and means to weld said ends to connect the same permanently, thereby to form desired lengths of chain having links of which the opposite ends are twisted substantially at 90° to each other and the weldment of the ends is intermediately of the ends of one side of each link.

8. The chain forming apparatus according to claim 7 in which the means to bend said ends of said pieces comprise a pair of shafts rotatably supported on axes at approximately 90° as viewed along the axis of the gripped piece, and a head mounted on the outer end of each shaft, lugs projecting from an outer face of each head toward the gripped piece of wire and spaced to receive the ends of said gripped piece therebetween, and means to rotate said shafts in opposite rotary directions to bend said ends of each clamped piece toward each other.

9. The chain forming apparatus according to claim 8 in which said shafts are also within planes substantially parallel to each other and at an acute angle to the axes of the pieces being bent as viewed from above said gripping means.

10. The chain forming apparatus according to claim 8 further including means to move said shafts axially in opposite directions toward and from the operative positions thereof in which the heads bend said ends of said pieces, the ends of said lugs being shaped to permit withdrawal thereof from the looped ends of formed links at the completion of the shaping thereof.

11. The chain forming apparatus according to claim 8 including drive means connected to said shafts and operable to drive each shaft uni-directionally.

12. The chain forming apparatus according to claim 11 in which said driving means are adapted to hold said heads stationary at the completion of the bending operation to hold the ends of the bent piece in engagement while being welded.

13. The chain forming apparatus according to claim 12 further including means interconnected with each rotatable shaft and head unit to prevent reverse rotation thereof while holding the ends of the bent piece in engagement while being welded.

14. The chain forming apparatus according to claim 7 in which said welding means include spot-welding electrodes, and means supporting said electrodes for reciprocating movement radially relative to the engaged ends of a bent piece to be welded.

15. The chain forming apparatus according to claim 14 in which there are more than two electrodes, and the means to support the same are arranged to support them at equal angles relative to each other.

16. The chain forming apparatus according to claim 14 in which said welding electrodes are positioned opposite said gripping means, whereby the formed links are welded at one side thereof substantially midway between the ends of said side.

17. A chain comprising an indeterminate number of similar connected elongated pre-twisted links each formed from similar lengths of metallic wire stock having the opposite ends thereof provided with compound bends to dispose the ends of said links within planes approximately at 90° to each other about the longitudinal axis of said links, the ends of said bent wire lengths having complementary and abutting surfaces at least partially overlapping each other relative to the horizontal plane of the formed link when lying flat upon a horizontal surface and said ends being connected by a spot weld to form one side of each link and the opposite side of each link being substantially straight and untwisted between the curved ends thereof.

References Cited

UNITED STATES PATENTS

| | | | |
|---|---|---|---|
| 628,439 | 7/1899 | Cartledge | 59—28 |
| 987,295 | 3/1911 | Graves | 59—18 |
| 1,563,993 | 12/1925 | Johnston | 59—28 |
| 2,190,130 | 2/1940 | Stahl | 59—35 |
| 2,820,874 | 1/1958 | Dunn | 59—31 |

FOREIGN PATENTS

| | | |
|---|---|---|
| 55,061 | 8/1912 | Austria. |
| 689,391 | 3/1953 | Great Britain. |

CHARLES W. LANHAM, *Primary Examiner.*

G. P. CROSBY, *Assistant Examiner.*